(12) United States Patent
Nemeth-Csoka et al.

(10) Patent No.: US 7,047,150 B2
(45) Date of Patent: May 16, 2006

(54) METHOD FOR DETERMINING A ROTOR POSITION OF A SYNCHRONOUS MOTOR

(75) Inventors: Mihaly Nemeth-Csoka, Erlangen (DE); Stefan Künzel, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 140 days.

(21) Appl. No.: 10/815,104

(22) Filed: Mar. 31, 2004

(65) Prior Publication Data
US 2005/0187735 A1 Aug. 25, 2005

(30) Foreign Application Priority Data
Feb. 19, 2004 (DE) .............. 10 2004 008 250

(51) Int. Cl.
*G01C 17/00* (2006.01)

(52) U.S. Cl. ............ 702/151; 318/254; 340/870.34
(58) Field of Classification Search ........ None
See application file for complete search history.

(56) References Cited

U.S. PATENT DOCUMENTS 6,388,420 B1 * 5/2002 Jansen et al. .......... 318/799
6,401,875 B1 * 6/2002 Marvin et al. .......... 187/393
6,762,573 B1 * 7/2004 Patel .................... 318/254

FOREIGN PATENT DOCUMENTS

DE 102 15 428 A1 10/2003

OTHER PUBLICATIONS

IEEE Transactions on Industrial Electronics, vol. 45, No. 4, Aug. 1998, pp. 682-685.

* cited by examiner

*Primary Examiner*—Michael Nghiem
*Assistant Examiner*—Stephen J. Cherry
(74) *Attorney, Agent, or Firm*—Henry M. Feiereisen

(57) ABSTRACT

In a method for determining the rotor position of a synchronous motor, a plurality of current vectors having different directions is applied to the synchronous motor. Absolute values of required ones of the current vectors are determined to obtain a defined excursion of the rotor. Inverse values of the determined current vectors are then digitally filtered using several of the inverse values to determine Fourier coefficients of the first harmonic of the inverse values. The rotor position of the synchronous motor can then accurately be computed with the determined Fourier coefficients.

10 Claims, 4 Drawing Sheets

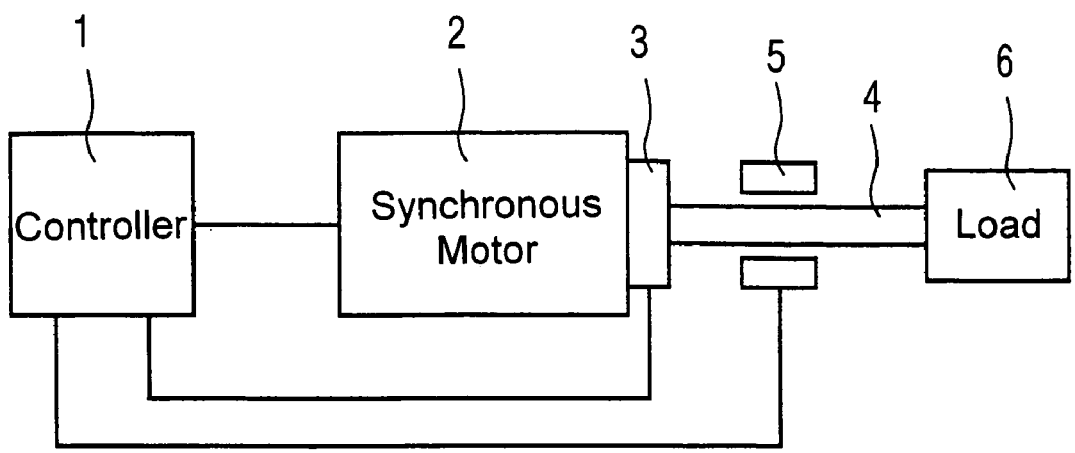
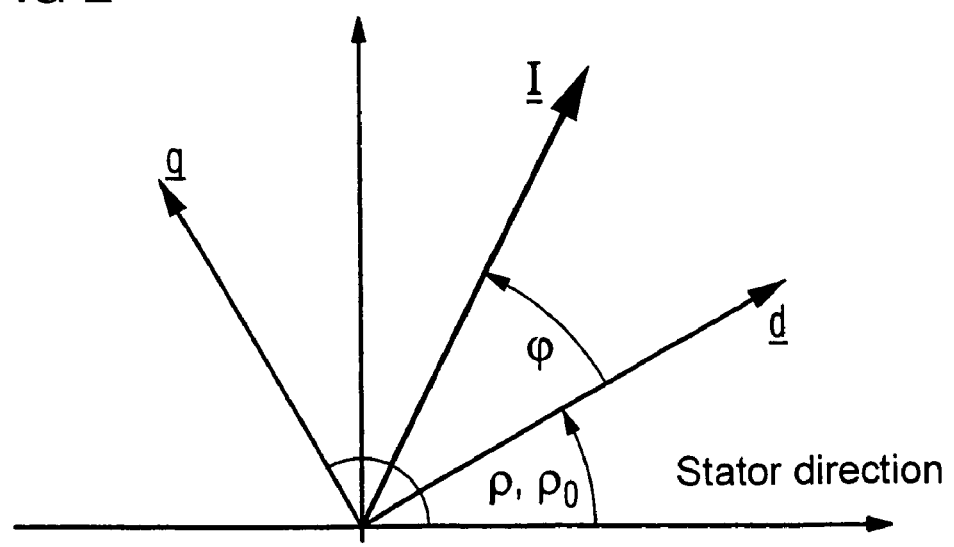

METHOD FOR DETERMINING A ROTOR POSITION OF A SYNCHRONOUS MOTOR

CROSS-REFERENCES TO RELATED APPLICATIONS

This application claims the priority of German Patent Application, Ser. No. 10 2004 008 250.2, filed Feb. 19, 2004, pursuant to 35 U.S.C. 119(a)–(d), the disclosure of which is incorporated herein by reference.

BACKGROUND OF THE INVENTION

The present invention relates to a method for determining a rotor position of a synchronous motor. The present invention also relates to a data carrier with a computer program stored thereon for performing method, as well as to a computer with a program memory for storing the computer program. The present invention further relates to a machine-tool or production machine with the computer, wherein the computer can be implemented as a controller. In the following description, the term "production machine" is used in a generic sense and also includes robots which generally follow the concepts outlined here.

Several conventional methods are known for determining the position of a rotor of a synchronous motor relative to the stator of the synchronous motor in order to determine the electrical commutation of the motor without requiring a position measuring device to provide position information. Many of these methods are based on complex measurements of the inductances of the motor, or on measuring and determining the electromotive counterforce. Such methods make it possible to operate a synchronous motor without employing a position measuring device.

If the rotor position angle is only determined during ramp-up or start-up of the synchronous motor, for example for determining an offset between the zero position of the position measuring device and the rotor or for moving the rotor to a reference point, then less complex methods can be used to determine the rotor position.

German patent publication DE 102 15 428 A1 describes a method for determining the rotor position of a synchronous motor, whereby a plurality of current vectors is applied to the synchronous motor in different directions and the absolute value of the current vector necessary for obtaining a defined excursion of the rotor is determined. The motor position is subsequently computed from at least one angular position of the current vector, at which the absolute value of the current vector necessary for achieving the defined excursion is at a minimum. However, the curve describing the absolute value of the current vectors is very flat particularly in the vicinity of the minimum absolute values of the current vectors and the measured values have superimposed disturbances in practical applications. As a consequence, the motor position cannot be adequately determined.

It would therefore be desirable and advantageous to provide a method for determining the rotor position of a synchronous motor, which obviates prior art shortcomings and is specifically capable of accurately determining the rotor position in spite of existing disturbances and the flatness of the curve of the absolute value of the current vector.

SUMMARY OF THE INVENTION

According to one aspect of the present invention, a method for determining the rotor position of a synchronous motor includes the steps of applying to a synchronous motor a plurality of current vectors having different directions, determining absolute values of required ones of the current vectors to obtain a defined excursion of the rotor, determining inverse values of the determined absolute values of the current vectors, digitally filtering using several of the inverse values to determine Fourier coefficients of a first harmonic of the determined inverse values, and computing with the determined Fourier coefficients the rotor position of the synchronous motor.

According to another advantageous feature of the invention, an opposite mathematical sign can be applied to the determined inverse values in a range of where the excursion of the rotor is negative, before determining the Fourier coefficients. In this way, the values of the current vectors that are measured in the range of a negative excursion of the rotor can also be used for determining the rotor position of the synchronous motor.

According to another advantageous feature of the invention, the motor position can be measured with particular accuracy by determining the Fourier coefficients of the first harmonic of the inverse values through a digital filtering process using all inverse values.

According to still another advantageous feature of the invention, the Fourier coefficients of the first harmonic of the inverse values can be determined by digitally filtering only the inverse values that are in a range where the excursion of the rotor is negative. Alternatively, the Fourier coefficients of the first harmonic of the inverse values can be determined by digitally filtering several inverse values only in a range where the excursion of the rotor is positive. These approaches minimize the computing time as compared to an evaluation process that includes all the inverse values.

According to another advantageous feature of the invention, a brake can be applied that holds the rotor before applying the plurality of current vectors. By using a brake, the method can be performed independently of the mechanical configuration of the synchronous motor and of other mechanical conditions.

According to another aspect of the invention, the method can be executed by providing a data carrier with the computer program stored thereon. In addition, a computer can be provided with a program memory for storing a computer program that causes the computer to execute the afore-described method. Advantageously, the computer can be implemented as a controller.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a block diagram of a drive unit with a synchronous motor;

FIG. 2 is a vector diagram of the stator currents;

DETAILED DESCRIPTION OF PREFERRED EMBODIMENTS

Figure 3:
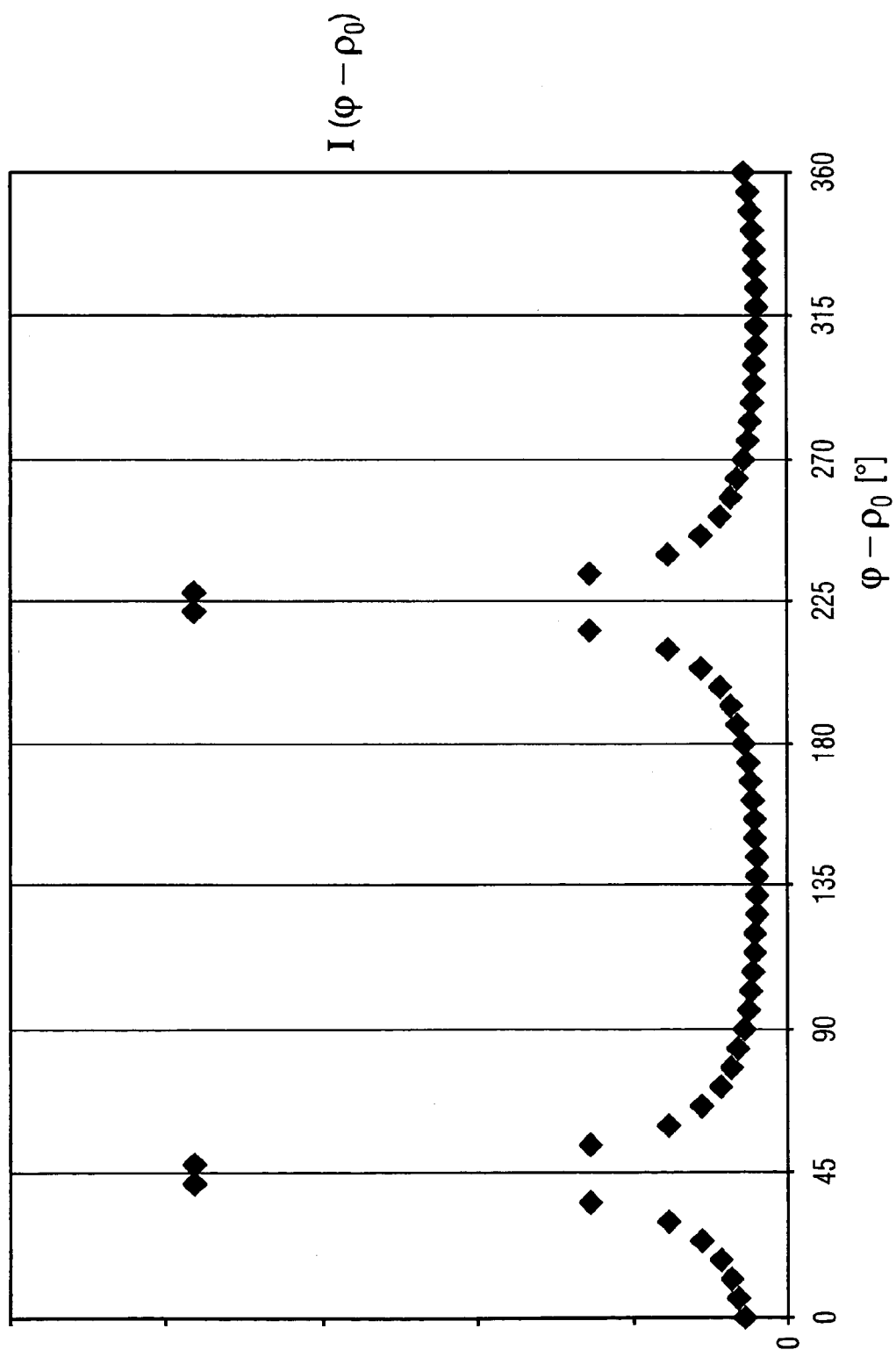
FIG. 3 is a graphical illustration showing the absolute values of the current vectors as a function of the rotor position angle.

Turning now to the drawing, and in particular to FIG. 1, there is shown a block diagram of a drive unit with a synchronous motor 2, which is controlled by a controller 1. The rotor position of the synchronous motor 2, which in the illustrated exemplary embodiment is defined as a rotor position angle ρ, is measured by a position measuring device 3. The position measuring device 3 can be implemented, for example, in the form of an incremental rotation transducer enables computation of absolute position values only after moving past a reference point. The position measuring device 3 is connected with the shaft 4 of the synchronous motor 2. Since the shaft 4 is rigidly connected with the rotor of the synchronous motor 2, the rotor position angle ρ defines the position of the shaft 4. Optionally, a brake 5 can be applied to the shaft 4. Such mechanical or electrical brakes 5 are commonly used to quickly brake a motion or to hold axes without applying an electrical current. The brake 5 can be activated by the controller 1. A useful load 6 can be driven by the shaft 4, for example, the tool spindle of a machine-tool or production machine, or a linear axle of a production machine driven by the spindle. The drive unit can also be used for driving a production machine or any other suitable type of machine.

Turning now to the drawing, and in particular to FIG. 1, there is shown a block diagram of a drive unit with a synchronous motor 2, which is controlled by a controller 1. The rotor position of the synchronous motor 2, which in the illustrated exemplary embodiment is defined as a rotor position angle ρ, is measured by a position measuring device 3. The position measuring device 3 can be implemented, for example, in the form of an incremental rotation encoder enables computation of absolute position values only after moving past a reference point. The position measuring device 3 is connected with the shaft 4 of the synchronous motor 2. Since the shaft 4 is rigidly connected with the rotor of the synchronous motor 2, the rotor position angle ρ defines the position of the shaft 4. Optionally, a brake 5 can be applied to the shaft 4. Such mechanical or electrical brakes 5 are commonly used to quickly brake a motion or to hold axes without applying an electrical current. The brake 5 can be activated by the controller 1. A useful load 6 can be driven by the shaft 4, for example, the tool spindle of a machine-tool or production machine, or a linear axle of a production machine driven by the spindle. The drive unit can also be used for driving a production machine or any other suitable type of machine.

FIG. 2 shows in form of a vector diagram the effective directions of the magnetic fields and the applied current vector I. The magnetic field of the rotor of a permanent-excited synchronous machine has a major effective direction d which rotates together with the rotor. The magnetic field is generated, for example, by permanent magnets disposed of the rotor. A force can be generated by applying the current vector I, which can have the form of a current space vector, to the stator windings in a direction q a perpendicular to the magnetic field. Since the magnetic induction is fixedly defined by the permanent magnets of the rotors, a field-oriented control requires that information about the actual rotor position angle ρ is available at each point in time. The machines typically include a position measuring device in the form of a transducer with incremental marks or tracks. Because the transducer does not have an absolute reference position, an initial position value $\rho_0$ of the rotor position angle ρ has to be determined before a controlled startup of the motor.

A 360° rotation in the vector diagram of FIG. 2 corresponds to an electric 360° rotation. In a multi-pole machine, a mechanical 360° rotation can correspond to several electric 360° revolutions. It should be noted that all described angles relate to the electric rotation. It will also be understood, that a synchronous motor can be implemented not only as a rotary motor, but also as a linear motor, in which case the angles are converted to distances on a linear axis. It is not important for the described method of the invention if the permanent magnets are applied on the rotor side, as in the depicted example, or on the stator side, in which case the current vector would be applied to the rotor.

The rotor position angle $\rho_0$ of the stationery motor will now be determined by the method of the invention. With the brake 5 (see FIG. 1) applied, several current vectors I with different angular positions φ (see FIG. 2) are applied to the synchronous motor 2. A current deviation is applied to each of these current vectors I parallel to a corresponding current vector I so as to generate a small defined excursion Δβ of the rotor against the holding force of the brake. The resulting curve depicted in FIG. 3 shows two minima for the absolute values I of the current vectors I that are each offset by 90° and located before and after the rotor position angle $\rho_0$ that is to be determined. The excursion Δβ of the rotor changes its direction from negative values to positive values in the vicinity of the position of the rotor position angle $\rho_0$ to be determined.

The current vector I is hereby defined by the equation:

$$I(\phi-\rho_0) = I \cdot \sin(\phi-\rho_0) \qquad (0)$$

The torque of a synchronous motor in the voltage control range is proportional to the absolute value I of the current and the sine of the angle φ of the current vector with respect to the major effective direction d of the magnetic field of the rotor according to FIG. 1. The torque of the synchronous machine is then:

$$m_1 = k_1 \cdot I \cdot \sin(\phi-\rho_0) \qquad (1)$$

wherein $m_1$ is the torque and $k_1$ is the motor constant which is derived from the mechanical and electrical configuration of the motor.

The return torque $m_2$ of the braked axle is defined by the equation:

$$m_2 = k_2 \cdot \Delta\beta \qquad (2)$$

wherein $k_2$ is the spring constant and Δβ the excursion measured by the position measuring device.

In the steady-state, the two torques are identical, so that the following equation governs:

$$k_1 \cdot I \cdot \sin(\phi-\rho_0) = k_2 \cdot \Delta\beta. \qquad (3)$$

Following the basic idea of the measurement, the respective absolute value I of each current vector I is increased until the excursion Δβ reaches a predefined value. In this stationery state, the constants $k_1$, $k_2$ and Δβ can be combined into a single constant K. The equation (3) can then be written in a simplified form as:

$$I(\varphi - \rho_0) = K \cdot \frac{1}{\sin(\varphi - \rho_0)} \quad (4)$$

In FIG. 3, the absolute values $I(\varphi-\rho_0)$ of the current vectors I are plotted as a function of the angle $\varphi-\rho_0$.

As seen in FIG. 3, evaluating the current minima, as proposed in German patent publication DE 102 15 428 A1, is problematic because the curve shape is quite flat about the minimum position and because the current values are small. In addition, in an actual measurement the measured values, unlike the depicted idealized points, frequently have superimposed noise and other disturbance values, so that the measured minima do not always coincide with the actual minima. Since a current value may only be determined every 5°, the rotor angle $\rho_0$ to be determined can also be located between two adjacent measured values, which can result in an erroneous determination of the rotor position angle $\rho_0$. Averaging these values, as proposed in DE 102 15 428 A1, does not eliminate the afore-described disadvantages.

Unlike the method described in German patent publication DE 102 15 428 A1, the present invention employs an entirely different evaluation technique.

Figure 4:
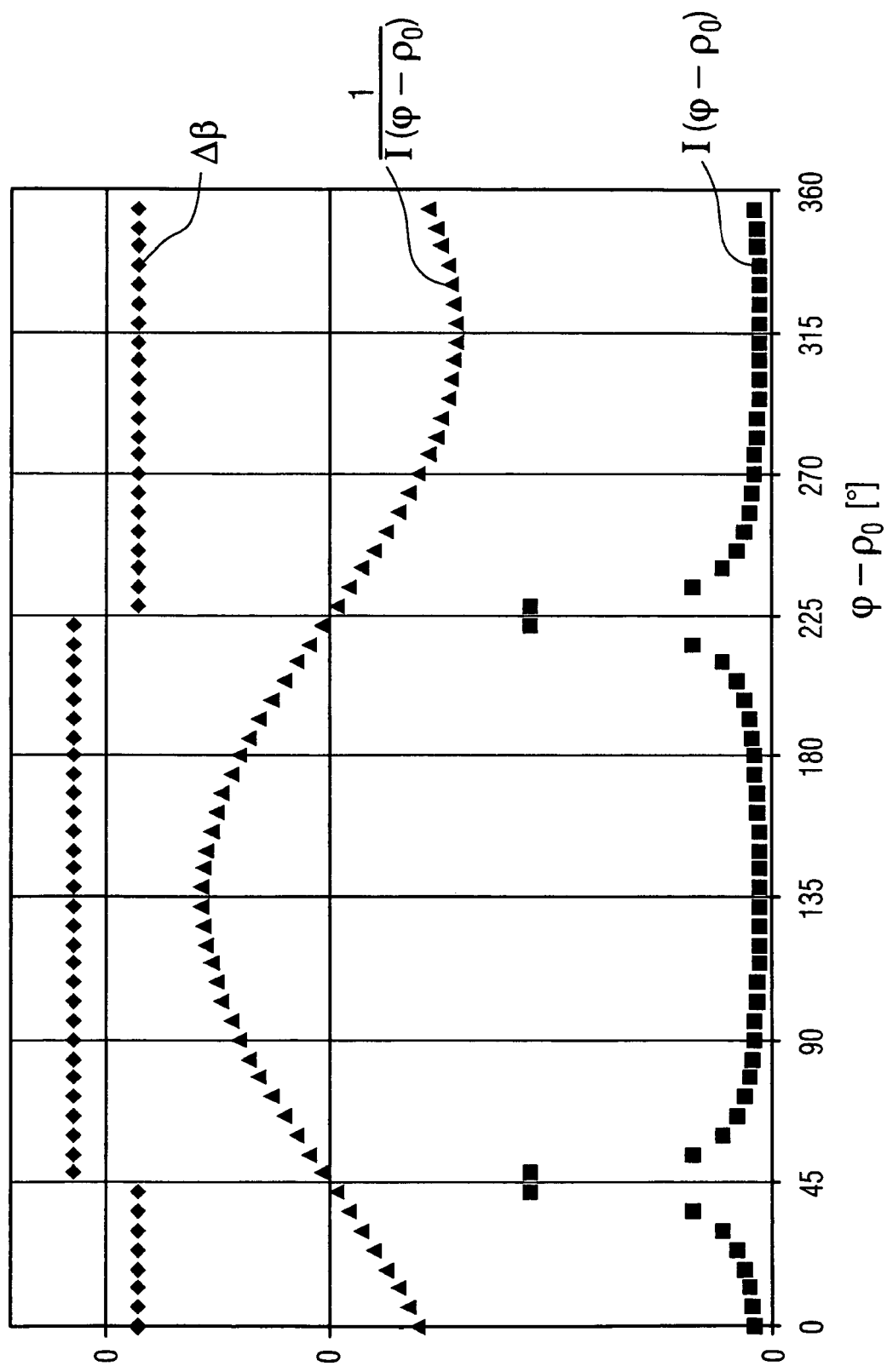
FIG. 4 is a graphical illustration showing the absolute values of the current vectors, the corresponding inverse values and the excursion as a function of the rotor position angle.

FIG. 4 shows the operation of the method of the invention. Shown in FIG. 4 is again the curve with the absolute values $I(\varphi-\rho_0)$ of the current vectors I plotted as a function of the angle $\varphi-\rho_0$, corresponding to the curve of the absolute values I of the current vectors I of FIG. 3. According to the invention, the inverse values of the absolute values of current vectors are determined in a first method step. The inverse values $1/I(\varphi-\rho_0)$ are obtain from $$\frac{1}{I(\varphi - \rho_0)} = \frac{1}{K} \cdot \sin(\varphi - \rho_0) \quad \text{for } \Delta\beta \geq 0 \quad (5)$$

$$\frac{1}{I(\varphi - \rho_0)} = -\frac{1}{K} \cdot \sin(\varphi - \rho_0) \quad \text{for } \Delta\beta < 0 \quad (6)$$

The inverse values of the absolute values of current vectors have the opposite mathematical sign in those regions where the excursions $\Delta\beta$ are negative. In the illustrated exemplary embodiment, the excursion $\Delta\beta$ is positive in a range between 45° and 225° and negative in a range between 225° and 45°, as shown in FIG. 4. Accordingly, in the illustrated exemplary embodiment, the inverse values were taken between 45° and 225°, whereas the opposite mathematical sign was applied to the inverse values taken between 225° and 45°. The inverse values $1/I(\varphi-\rho_0)$ have then a sinusoidal dependence. In addition to the curve with the absolute values $I(\varphi-\rho_0)$ of the current vectors I plotted as a function of the angle $\varphi-\rho_0$, FIG. 4 also shows curves with the inverse values $1/I(\varphi-\rho_0)$ as well as the excursion $\Delta\beta$ plotted as a function of the angle $\varphi-\rho_0$. The zero position on the ordinate for each curve is also shown. The upper zero position is associated with the excursion $\Delta\beta$, the center zero position is associated with the inverse values $1/I(\varphi-\rho_0)$, and the lower zero position is associated with the absolute values $I(\varphi-\rho_0)$ of the current vectors I.

In the next method step, the Fourier coefficients a and b of the first harmonic of the inverse values of the absolute values of the current vectors are determined by digital filtering over several inverse values. Several digital filtering methods are known that can be used to determine the Fourier coefficients a and b. In the present embodiment, a complex Fourier transformation which is known in the art is used to determine the Fourier coefficients by digital filtering. The first harmonic of the inverse values of the absolute values of the current vectors is defined by the equation:

$$\frac{1}{I(\varphi - \rho_0)} = a \cdot \sin(\varphi - \rho_0) + b \cdot \cos(\varphi - \rho_0) \quad (7)$$

wherein a is the Fourier coefficient of the imaginary part, and b is the Fourier coefficient of the real part.

The rotor position angle $\rho_0$ can then be determined from the Fourier coefficients a and b via the relationship:

$$\rho_0 = \arctan\left(\frac{a}{b}\right) \quad (8)$$

The arc tangent function is determined by properly taking into account the mathematical signs of a and b in all four quadrants.

Several possibilities exist for digitally filtering the inverse values, i.e., for selecting the values and the number of inverse values to be used for computing the Fourier coefficients. To obtain the most accurate result, it may be advisable to compute the Fourier coefficients by including all the inverse values, i.e., the width of the digital filtering window includes all the inverse values of a complete electrical 360° rotation. If the available computing time is less, then the rotor position value $\rho_0$ can be determined with sufficient accuracy by selecting for determining the Fourier coefficient only those inverse values where the excursion $\Delta\beta$ is positive. Alternatively, only inverse values associated with negative values of the excursion $\Delta\beta$ may be included.

It will be understood by persons skilled in the art that subsets of the afore-described inverse values can be used for determining the Fourier coefficients; alternatively, inverse values from both ranges can be used for digital filtering.

The accuracy with which the rotor position angle $\rho_0$ can be determined depends on the number of inverse values used for determining the Fourier coefficients, i.e., the determination becomes more accurate with an increased width of the digital filter window. However, this also increases the computing time for digital filtering. In other words, using a large number of measured values for determining the rotor position angle $\rho_0$ increases the accuracy with which the rotor position angle $\rho_0$ can be determined.

A brake does not need to be applied for performing the method of the invention if the rotor can be held in a stationary or rest position by a suitable existing return torque, for example a friction force.

Figure 5:
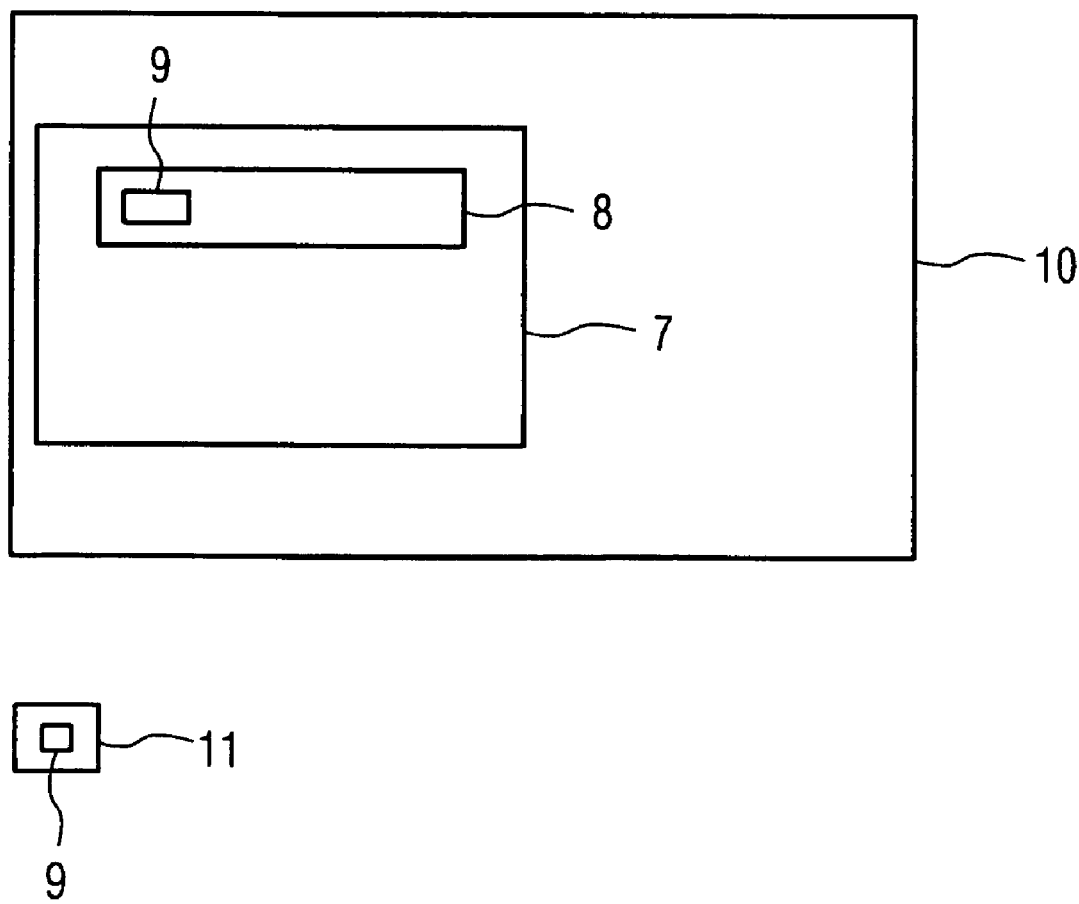
FIG. 5 is a schematic representation of a machine-tool or production machine.

As shown in FIG. 5, the method of the invention can be performed with a computer 7 having a program memory 8 in which a computer program 9 can be stored. The method of the invention can then be executed by the computer 7 by calling the computer program 9. The computer can be implemented, for example, as a controller. The controller 7 in the depicted exemplary embodiment of FIG. 5 is a component of a machine tool or production machine 10, whereby the machine tool or production machine 10 can include additional components that have been omitted from the drawing because they are not relevant for an understanding of the invention.

The computer program 9 also be stored on a data carrier 11, whereby the data carrier can be implemented, for example, as a flash card, diskette, CD-ROM, DVD or a hard drive.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

The method of the invention can also be performed with any type of synchronous motor and is not limited to applications associated with machine tools or production machines.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for determining a rotor position of a synchronous motor, comprising the steps of:
   applying to a synchronous motor a plurality of current vectors having different directions;
   determining absolute values of required ones of the current vectors to obtain a defined excursion of the rotor;
   determining inverse values of the determined absolute values of the current vectors;
   digitally filtering using several of the inverse values to determine Fourier coefficients of a first harmonic of the determined inverse values; and
   computing with the determined Fourier coefficients the rotor position of the synchronous motor.

2. The method of claim 1, wherein an opposite mathematical sign is applied to the determined inverse values in a range of a negative excursion of the rotor before determining the Fourier coefficients.

3. The method of claim 2, wherein the Fourier coefficients of the first harmonic of the determined inverse values are determined by digitally filtering using all inverse values.

4. The method of claim 2, wherein the Fourier coefficients of the first harmonic of the inverse values are determined by digitally filtering only the inverse values that are in the range of the negative excursion of the rotor.

5. The method of claim 1, wherein the Fourier coefficients of the first harmonic of the inverse values are determined by digitally filtering using several inverse values only in a range of a positive excursion of the rotor.

6. The method of claim 1, and further comprising the step of applying a brake to hold the rotor before applying the plurality of current vectors.

7. A data carrier having a computer program stored thereon for carrying out the method of claim 1.

8. A computer with a program memory having stored therein a computer program, said computer program causing the computer to execute the method of claim 1.

9. The computer of claim 8, wherein the computer comprises a controller.

10. A machine-tool or production machine comprising a controller according to claim 9.

* * * * *